Sept. 22, 1970  H. R. NEWELL  3,530,318

WOBBLE COIL STEPPING MOTOR

Filed April 15, 1968

INVENTOR
HAROLD R. NEWELL

BY *Hurvitz, Rose & Greene*

ATTORNEYS

United States Patent Office 3,530,318
Patented Sept. 22, 1970

3,530,318
WOBBLE COIL STEPPING MOTOR
Harold R. Newell, South Newbury, N.H., assignor to Mesur-Matic Electronics Corporation, Warner, N.H., a corporation of Delaware
Filed Apr. 15, 1968, Ser. No. 721,364
Int. Cl. H02k 37/00
U.S. Cl. 310—49                                    12 Claims

ABSTRACT OF THE DISCLOSURE

A stepping motor in which the wobbling rotor element that coacts with the stator, when the stator windings are energized in a specified winding sequence, to undergo wobble relative to the motor shaft and thereby to cause the meshing of mating gears attached to the rotor element, motor housing, and shaft, is a coil wound on a non-magnetic support for the element gears. The coil is energized so that it carries an electric current during motor operation.

BACKGROUND OF THE INVENTION

The present invention relates generally to step motors and more particularly to wobbling rotor step motors.

In my copending application for United States Patent, bearing Ser. No. 627,410, entitled "Harmonic Drive for Digital Step Motors," filed Mar. 31, 1967, and a continuation-in-part application bearing Ser. No. 664,331, entitled "Harmonic Drive for Digital Step Motor," filed Aug. 30, 1967, I disclose step motor drive systems utilizing significant variations of the harmonic drive concept. Harmonic drive generally encompasses an arrangement wherein areas of mating relationship or engagement between the teeth of two ring gears are peripherally propagated in the form of a sinusoidal or substantially sinusoidal wave representative of a wave deflection or strain wave in one of the gears. Details of such an arrangement are disclosed in U.S. Pat. 2,906,143 to Musser, issued Sept. 29, 1959.

In my copending application Ser. No. 627,410, I disclose improvements in the harmonic drive system, for use in stepping motors, wherein a wobble plate or wobble disk type of electromagnetic motor has stator windings that are sequentially excited in a predetermined switching format to produce the desired stepped rotation of the wobble plate rotor. According to an embodiment of that invention, a pair of cooperating circular ring gears of the same diameter have opposing teeth projecting from confronting substantially parallel planes. At least one of the ring gears is rigid and stationary, being fastened to a portion of the motor housing which is of cylindrical shape. The housing contains a generally annular stator core having slots defining poles therebetween and having a plurality of equiangularly spaced coils, corresponding to the desired number of motor phases, wound on respective ones of the poles. A shaft extends within an inner cylindrical wall of the housing along the axis thereof and is mounted for rotation in bearings retained at either end of the space encompassed by the inner wall. An armature or rotor in the form of a magnetically permeable circular plate is retained on the shaft for relative rotation therewith and has fastened to a planar surface adjacent its periphery the second of the aforementioned ring gears. One of the gears has a smaller number of teeth than the other, i.e., a tooth differential exists between the gears. The stator core poles confront the rotor, and as the phases (stator windings) are energized according to the selected switching format, the rotor is successively pulled, i.e., deflected toward each energized coil. Accordingly, the teeth of the two ring gears are forced into mating engagement, i.e., intermesh, along a limited area or sector at any given instant of time. As the coil (winding) switching progresses, the rotor wobbles about the shaft to produce a sinusoidal wave motion of this region of meshing. The rotor or armature may be of considerable mass and generally undergoes rotation at an extremely low rotary rate which is a function of the tooth differential, the number of motor phases, and the switching format by which the phases are excited. In consequence of the tooth differential, there is a relative rotation between the two ring gears, the sense or direction of rotation being governed by which of the gears has the fewer (or larger) number of teeth. In particular, if the armature has the fewer teeth it rotates that number of fewer teeth for each revolution of the wobble (i.e., each "wobble-around"), in a sense or direction opposite that of the rotation of the wobble. A second pair of ring gears is provided by which the armature (rotor) is placed in driving or driven relationship with the shaft such that the shaft undergoes discrete incremental (stepped) rotation according to the switching format phase energization of the motor. This second pair of gears is effective to transmit torque to the shaft.

The wobble plate rotates in precession on the "tracks" formed by the two sets of gears, its point of pivotal coupling to the shaft being in the form of a universal (e.g., ball and socket) joint free to move longitudinally along the shaft but restrained from radial movement relative to the shaft. In this manner, looseness and play in the gears are virtually eliminated, despite even the unevenness of gear teeth caused by wear.

The use of a plate or disk as the wobbling element, as disclosed in my aforementioned copending application, or of a drum, as disclosed in my copending application, Ser. No. 689,535, filed Dec. 11, 1967, entitled "Wobble Drum Step Motor," or any other element configuration made up wholly or in greater part of magnetically permeable material, necessitates a rather large mass, and hence, considerable difficulty in obtaining high speed stepping action. Of course, by the very nature of the device, it is desired that a true stepping action occur in the sense that the wobble element or rotor undergo incremental movement between positions of rest (i.e., between starting and stopping points). As an example, certain tape recorders of an incremental type require that tape movement cease for a predetermined time interval at which instant a quantum of information is stored ("written") on the tape. The necessity of a wobble element of large mass dictates an intolerably long period between initiation of a step and its conclusion, in the sense of unsuitability for such a practical application. That is to say, having exerted an impulse of force on the wobble element, a certain interval will transpire before motion resulting from that force in and of itself ceases, depending upon such factors as momentum of the element, friction, et cetera, and for an incremental tape recorder of the aforementioned type which uses a step motor in the tape transport mechanism, this interval may be excessive since large portions of the tape will therefore go unused.

It is accordingly an object of the present invention to provide a step motor of the aforementioned general type having a wobble element of improved characteristics to render it suitable for rapid stepping action.

It is a more specific object of the present invention to provide a wobble element requiring no magnetically permeable material, and hence, of substantially reduced mass relative to previously utilized types of wobble elements.

SUMMARY OF THE INVENTION

Briefly, according to the present invention, the wobble element comprises a coil of wire wound on a coil form attached to a disk of non-magnetic and non-conductive (electrically) material. The disk, which may be made of a strong stiff plastic material, is similar in configuration to that disclosed in my aforementioned application Ser. No. 627,410, having two ring gears or circular gears of differing diameter thereon, one of which is constructed and adapted to mesh with a fixed gear fastened to the motor housing and the other arranged to mesh with a gear coupled to the motor shaft. The wobble element is itself coupled to the shaft for wobbling and rotation thereon by a universal joint having axial freedom along the shaft, but no radial freedom. This implies a reasonably close sliding fit between the wall of the hole in the universal joint and the surface of the shaft inserted therein.

The coil is energized to carry an electric current during motor operation and the interaction between the magnetic flux surrounding the coil and the magnetic flux about the energized stator windings produces the desired wobbling.

BRIEF DESCRIPTION OF THE DRAWINGS

The above and still further objects, features, and attendant advantages of the present invention will become apparent from a consideration of the following detailed description of a preferred embodiment thereof, especially when taken in conjunction with the accompanying drawing, in which.

DESCRIPTION OF A PREFERRED EMBODIMENT

Figure 1:
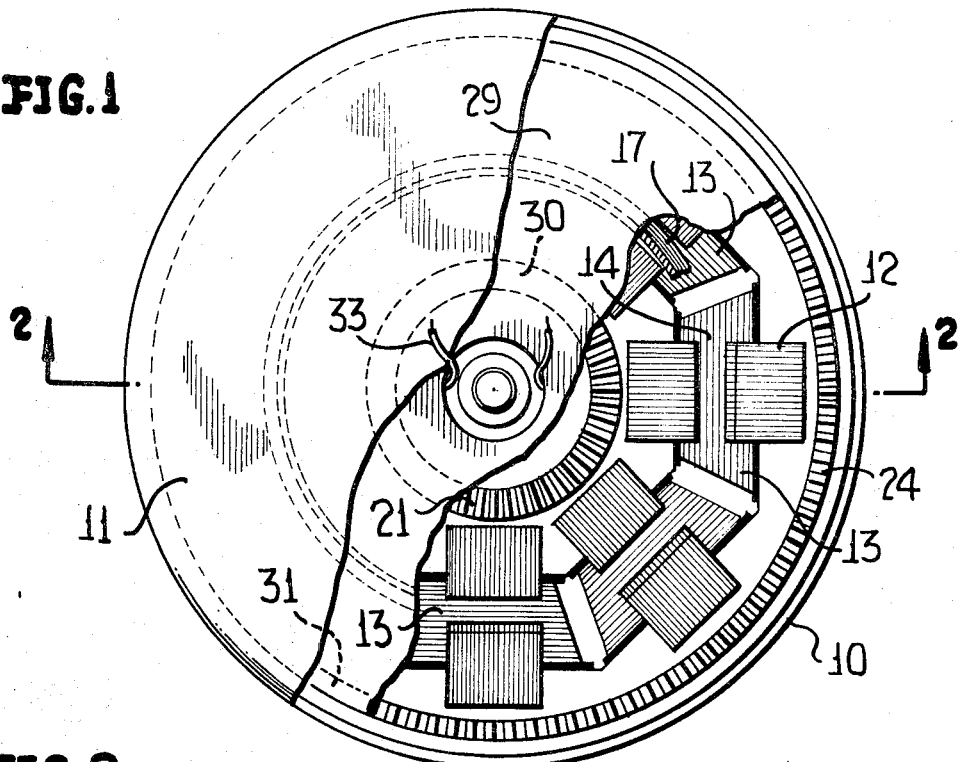
FIG. 1 is a fragmentary plan view of a stepping motor in accordance with the invention.

Referring now to the drawings, the motor has a double-walled cylindrical housing 10 of non-magnetic material, such as molded plastic, and a cup-shaped cover 11 of the same or similar material. Nested in recesses provided in the housing are a plurality of stator cores 12 and respective windings 13 thereon, here eight in number although this is for the sake of example only, spaced equiangularly about the center axis along which a shaft 15 is disposed. Each stator core is of U-shaped configuration with the free ends of the legs having opposing portions defining an air gap 14 and the respective winding 13 encompassing the portion bridging the legs, on a suitable coil form. The air gap 14 should be of sufficient width to accommodate the moving coil 17 (and any coil form supporting that coil) forming a portion of the wobble element 16, as will presently be described in greater detail.

Figure 2:
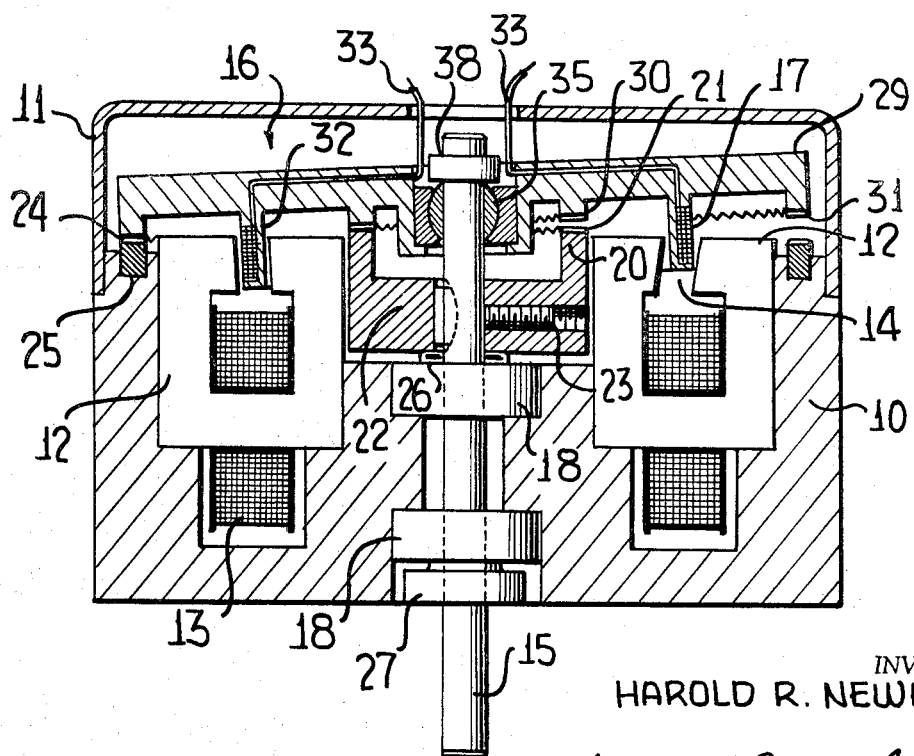
FIG. 2 is a sectional view of the motor taken along the lines 2—2 of FIG. 1.

Shaft 15 is mounted for rotation in bearings 18 and has attached thereto in the upper portion of the housing (as viewed in FIG. 2) a circular gear 20 whose teeth 21 project upwardly toward cover 11. Gear 20 is fastened to the shaft by a collar 22 which is keyed to the shaft and secured by a set screw 23. Another circular gear 24 is fixedly mounted to housing 10 within a suitable annular groove 25. In their attached positions, inner (or lesser diameter) gear 20 projects slightly above outer (or greater diameter) gear 24, relative to cover 11, by a dimension selected according to the desired tilt angle of wobble element 16. Adjustment of this dimension may be provided by use of spacer washers or sleeves 26 whose number may be appropriately varied between collar 22 and upper bearing 18. It is to be emphasized that the use of such modifying terms as "upper" and "lower" is for convenience only and is not intended as a limitation upon the orientation or attitude of the motor when in use. In general, the tilt angle of the wobble element should lie within the range from 1° to 3° and is preferably a value at the lower end of that range. The tilt angle is exaggerated in FIG. 2 for the sake of clarity.

A locking collar 27 is provided on the shaft at the lower end of the housing to prevent axial movement of the shaft without interference with rotation of the shaft.

Wobbling element or rotor 16 itself includes a disk-like structure 29 of non-magnetic material, preferably a rigid, strong plastic such as Bakelite, having fastened to its underside a pair of ring gears 30, 31 whose teeth are disposed in opposing relationship with the teeth of gears 20 and 24, respectively, for meshing therewith along a limited sector or region when the wobble element is tilted to force the gears into mating engagement. To the latter end, disk 29 is also provided at its underside with a ring-like or annular coil 17, preferably wound on a suitable thin annular coil form 32 fastened to the disk, and having electrical connections 33 projecting exteriorly of the motor housing to permit energization thereof from an external source of power (not shown). In the embodiment shown, the end connection leads for the coil 17 extend outwardly of the housing at or near the center of the motor via holes in the disk 29. As will subsequently be more fully explained, this is permissible by virtue of the restriction of the motion of the wobble element to wobbling (i.e., without rotation about the shaft), with some slight longitudinal (i.e., axial) movement allowable. On the other hand, conventional sliding electrical connections to the coil ends may be supplied if rotation of the wobble element is desired, although this involves greater complexity than the use of the preferred arrangement of fixed projecting leads.

Disk 29 is coupled to shaft 15 for motion relative thereto by a universal joint generally designated by reference numeral 35. Preferably, the universal joint is a conventional ball and socket arrangement, with the socket portion fixedly attached to the disk, and the ball portion having a hole therethrough to accept the shaft in a close sliding fit. In this manner, the wobble element may move axially along the shaft (and may rotate relative thereto) but is restrained from radial movement relative thereto. Inclination of the wobble element relative to the shaft is, of course, permitted by the very nature of the universal joint, i.e., the pivotal coupling. A restraining collar 38 is press fitted on the upper end of the shaft to limit the axial movement of the universal joint.

To prevent rotation of the wobble element on its axis, the outer ring gear 31 has the same number of teeth as fixed ring gear 24. Shaft 15 is nevertheless driven in rotation as the element 16 undergoes wobble alone, by the provision of different numbers of teeth on gears 20 and 30. Preferably, shaft gear 20 has one less or one more tooth than element gear 30, depending on whether shaft rotation in a reverse or a forward sense, respectively, relative to direction of element wobble, is desired.

In operation of the step motor, coil 17 is energized by an external power source to carry a current throughout the desired stepping action. The eight stator windings or phases 13 are energized in a desired sequence or switching format (e.g., phases 1 and 2 "on," phases 2 and 3 "on," phase 3 and 4 "on," et cetera), and the interaction between the magnetic fields surrounding the energized moving coil and the energized stator windings produces an attraction of the wobble element toward the stator cores associated with the energized windings. This tilting of the element 16 is converted to a wobble as adjacent stator windings are energized in sequence, the sets of inner and outer gears meshing along a limited sector. The provision of axial freedom of the wobble element ensures a complete meshing of the gears within this limited sector of engagement despite liberal tolerances in the original cutting of the gear teeth, or wear of the teeth with extensive use of the motor. The outer gears provide a reference or datum point for the position of the wobble element, while assuring positive driving of shaft gear 20, and with it, rotation of the shaft.

As previously observed, air gaps 14 in the stator cores must be sufficiently wide to permit entry of the moving coil 17 (and coil form, if any) during tilting of the wobble element, without the possibility of interference or binding. The moving coil need be composed of only a single layer of helically wound wire, which may be potted in place with epoxy resin rather than wound on a coil form, if desired. Of course, the potted coil must be attached to the disk, which is easily accomplished by use of a suitable bonding resin or other cement.

Should inner gear 30 of wobble element 16 have 46 teeth, and shaft gear 21 have 45 teeth, the shaft gear (and the shaft to which it is fastened) rotates one revolution in a reverse direction to the direction of "wobble-around" of element 16 for each forty-five consecutive "wobble-arounds." Since in this exemplary embodiment the stator has eight coils and cores, the shaft undergoes 360° of rotation once each 8×45=360 stator coil switchings. Accordingly, each energization of adjacent stator windings produces one degree of shaft rotation.

It should be observed that the gears may have confronting frictional surfaces other than teeth, by which to produce relative motion in response to contact therebetween along a limited sector whose position undergoes successive movement, according to selective deflection of the gears into contact with one another by the electromagnetic means including the stator coils and cores.

While I have disclosed a preferred embodiment of my invention, it will be apparent that variation of the details of construction which have been illustrated and described may be resorted to without departing from the spirit and scope of the invention, as defined in the appended claims.

I claim:

1. A motion transmitting system comprising at least one pair of cooperating gears having confronting frictional surfaces, a first means supporting one of said gears, universal joint means supporting said first means for axial and pivotal movement relative to an axis of rotation of said one of said gears, and electromagnetic means for selectively deflecting said one of said gears into contact with the other of said gears to produce frictional contact between said surfaces along a limited region of both said gears at any given instant, said gears having different dimensions for said frictional surfaces so that progressive deflection of said one of said gears into contact with said other of said gears is accompanied by relative rotation of said gears about said axis of rotation, said electromagnetic means comprising a plurality of sequentially arranged selectively energizable electromagnets opposing said first means, and a magnetic flux generating means secured to said first means and disposed in flux interacting relationship with each of said electromagnets.

2. The invention according to claim 1 wherein said magnetic flux generating means is an electric coil.

3. The invention according to claim 2 wherein each of said frictional surfaces comprise teeth, and wherein said frictional contact is achieved by engagement of said teeth, said different dimensions being produced by different numbers of teeth on said gears.

4. The invention according to claim 3 wherein said cooperating gears are annular, lying along a common axis, the teeth thereof projecting from normally uncurved confronting surfaces thereof; said first means supporting one of said gears further including a non-magnetic element coupled to said one gear, and having said electrical coil mounted thereto in annular configuration; said electromagnets including electromagnetic actuators disposed in circular array about said common axis, each of said actuators effective when energized to produce an electromagnetic field exerting deflecting forces on said coil and therefore on said one gear coupled thereto in response to current flow through said coil.

5. The invention according to claim 4 wherein said non-magnetic element comprises a rigid circular plate, said ring gear fastened to a planar surface thereof adjacent the periphery of said plate, a shaft extending along said axis and through said plate, normally perpendicular thereto, said plate retained on said shaft to permit relative rotation and limited angular orientation therebetween from the normally perpendicular relationship.

6. The invention according to claim 2 wherein said plurality of electromagnets are annularly arranged about said axis of rotation, said electrical coil is annular and coaxial with said axis and said first means is non-magnetic.

7. A step motor, comprising
   a shaft,
   at least two cooperating gears having confronting spaced frictional surfaces of different dimension and having a common axis with said shaft,
   non-magnetic support means for one of said gears,
   an electrical coil secured to said support means,
   means pivotally coupling said support means to said shaft for axial movement therealong and in relatively rotatable relationship therewith, while substantially confining said support means radially with respect to said shaft, and
   selectively energizable electromagnetic means for selectively attracting said coil, and thereby said support means, into a pivoted position relative to said shaft to continuously force successive portions of said gears into and out of frictional contact with one another in wobbling motion fashion to produce relative rotation of said gears.

8. The invention according to claim 7 wherein is further provided means coupling one of said gears to said shaft to produce rotation of said shaft in response to the relative wobble motion of said gears.

9. The invention according to claim 7 wherein is provided a housing for said motor,
   a further pair of cooperating gears, one fixedly connected to said housing and the other supported by said non-magnetic support means, and
   a gear of the first-mentioned cooperating gears, other than said one supported by said support means, secured to said shaft to produce rotation thereof in response to the relative wobble motion of the gears.

10. The invention according to claim 9 wherein the frictional surfaces of all said gears comprise teeth, and wherein said further pair of gears have the same number of teeth, whereby said support means undergoes wobble motion without rotation relative to said housing in response to the relative wobble motion of said gears.

11. The invention according to claim 10 wherein said non-magnetic support means comprises a plastic disc rotor, and wherein said electromagnetic means comprises a stator having a plurality of core-coil combinations corresponding to switching phases for said motor.

12. The invention according to claim 7 wherein said coil is energized concurrently with said electromagnetic means to produce said attraction.

References Cited

UNITED STATES PATENTS

| | | | |
|---|---|---|---|
| Re. 22,549 | 9/1944 | Plensler | 310—82 |
| 2,871,382 | 1/1959 | Bouvier | 310—82 |
| 2,953,944 | 9/1960 | Sundt | 310—82 |
| 3,262,081 | 7/1966 | Fairbanks | 310—82 |
| 3,428,839 | 2/1969 | Singleton | 310—82 |

FOREIGN PATENTS 234,879   3/1945   Switzerland.

WARREN E. RAY, Primary Examiner

R. SKUDY, Assistant Examiner

U.S. Cl. X.R.

74—640; 310—82